March 22, 1932.  E. G. WESSMAN  1,850,522
DISPENSING, FILLING, AND CAPPING MACHINE
Filed Sept. 20, 1926  11 Sheets-Sheet 6
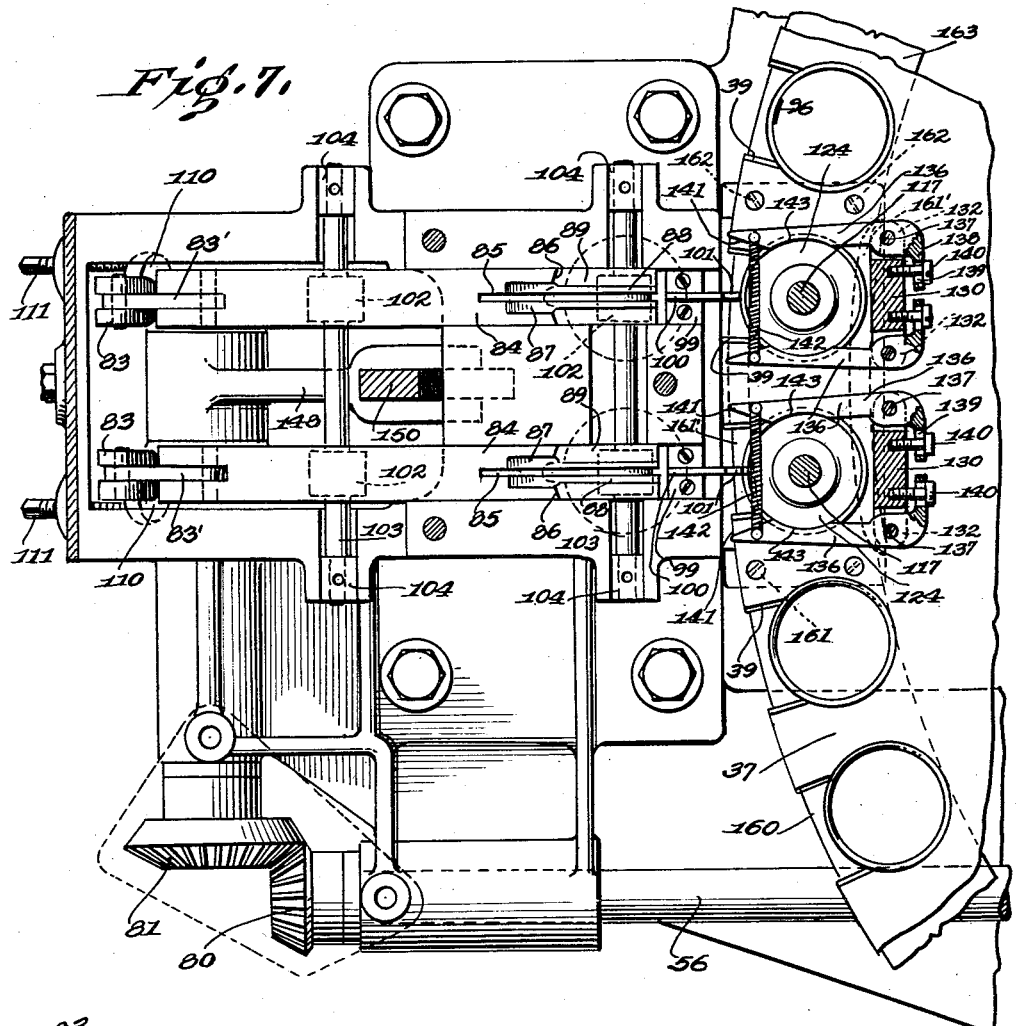
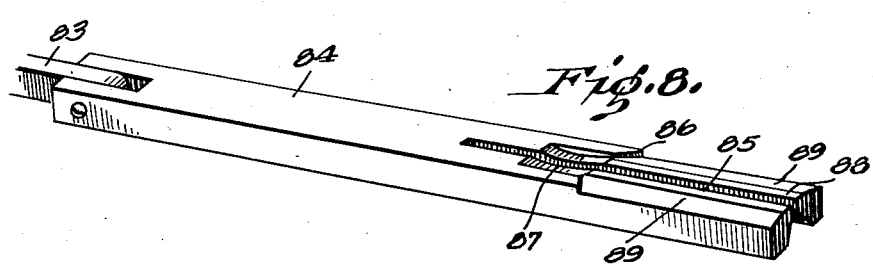
Inventor
Edwin G. Wessman
By Milans & Milans
Attorneys

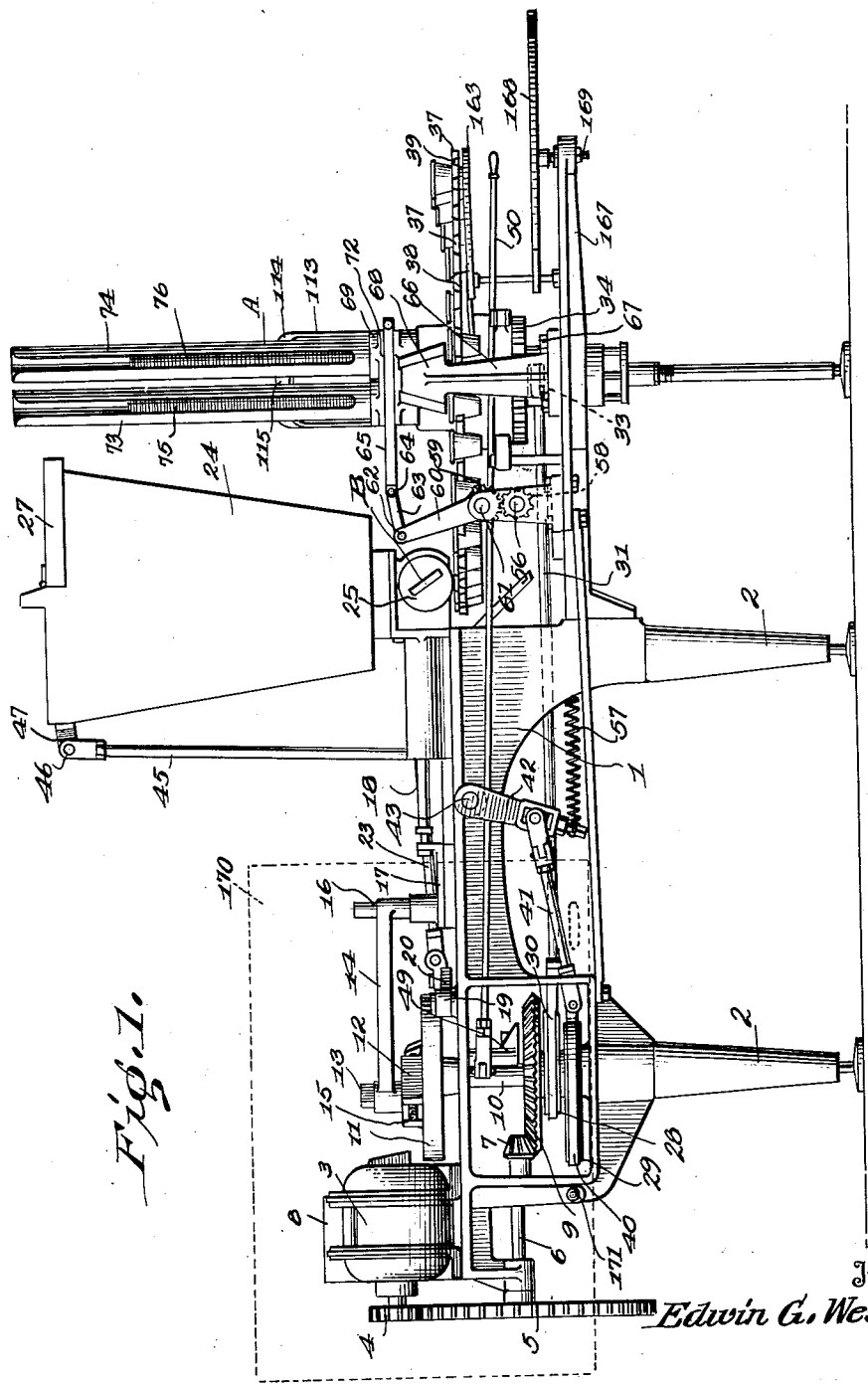

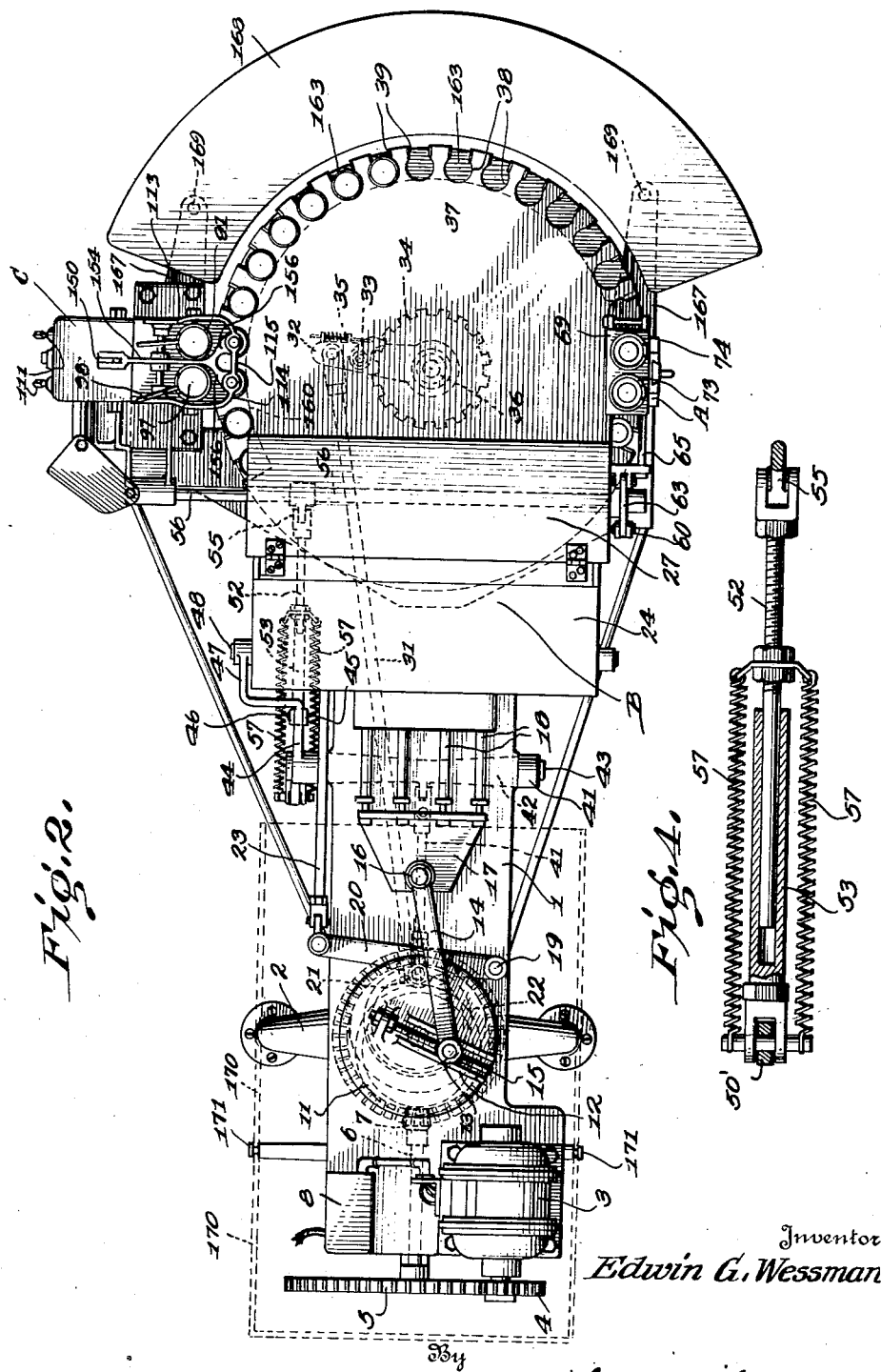

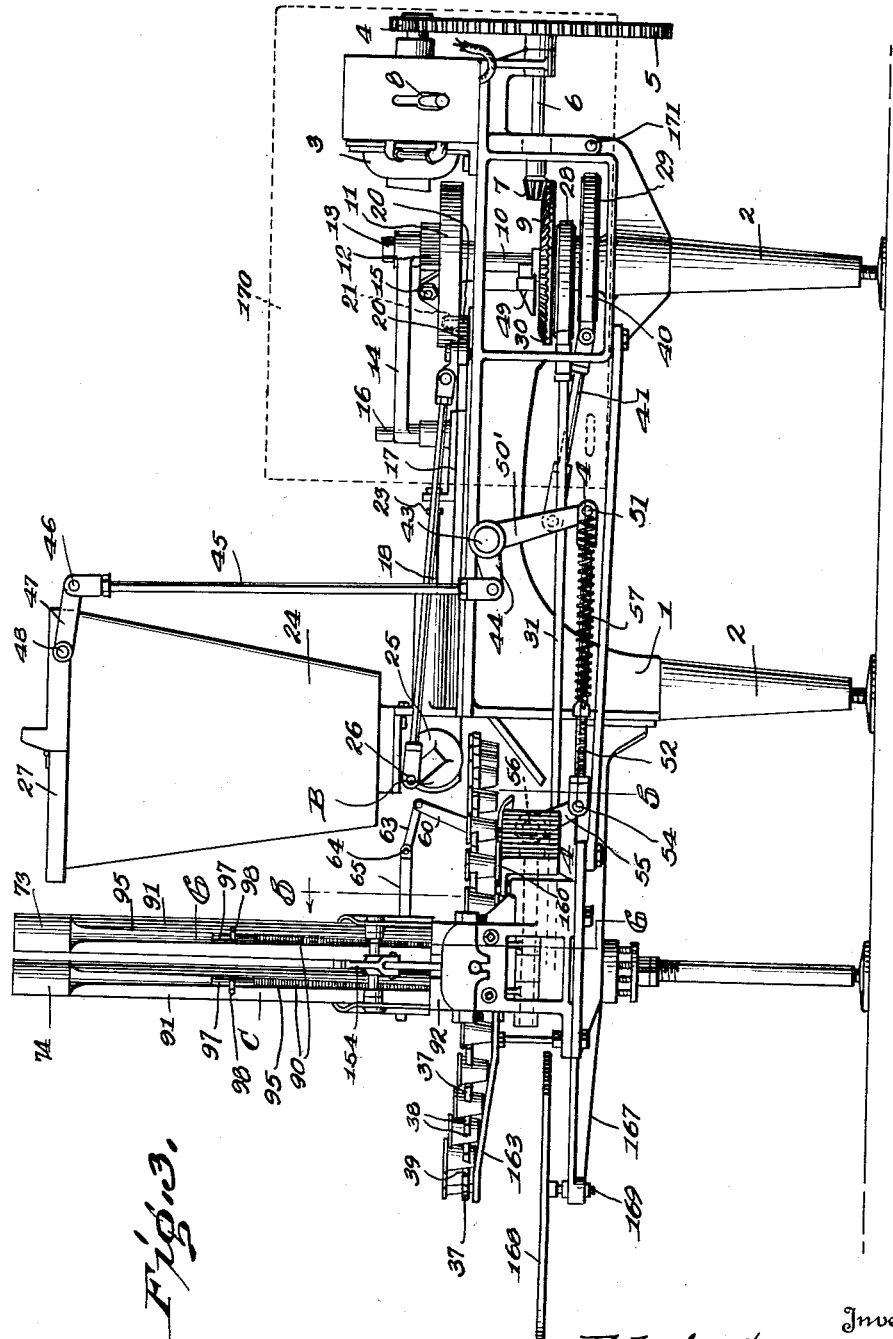

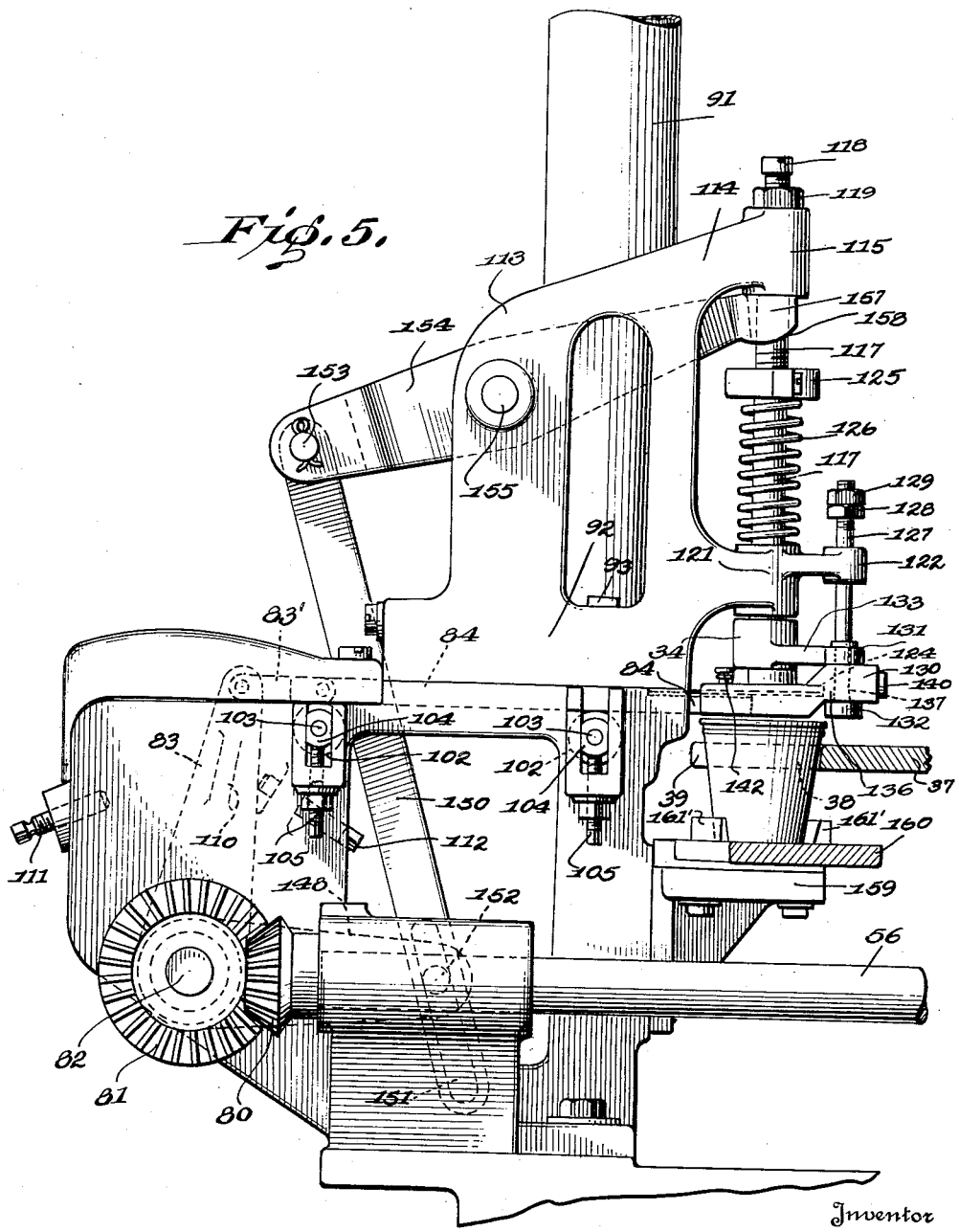

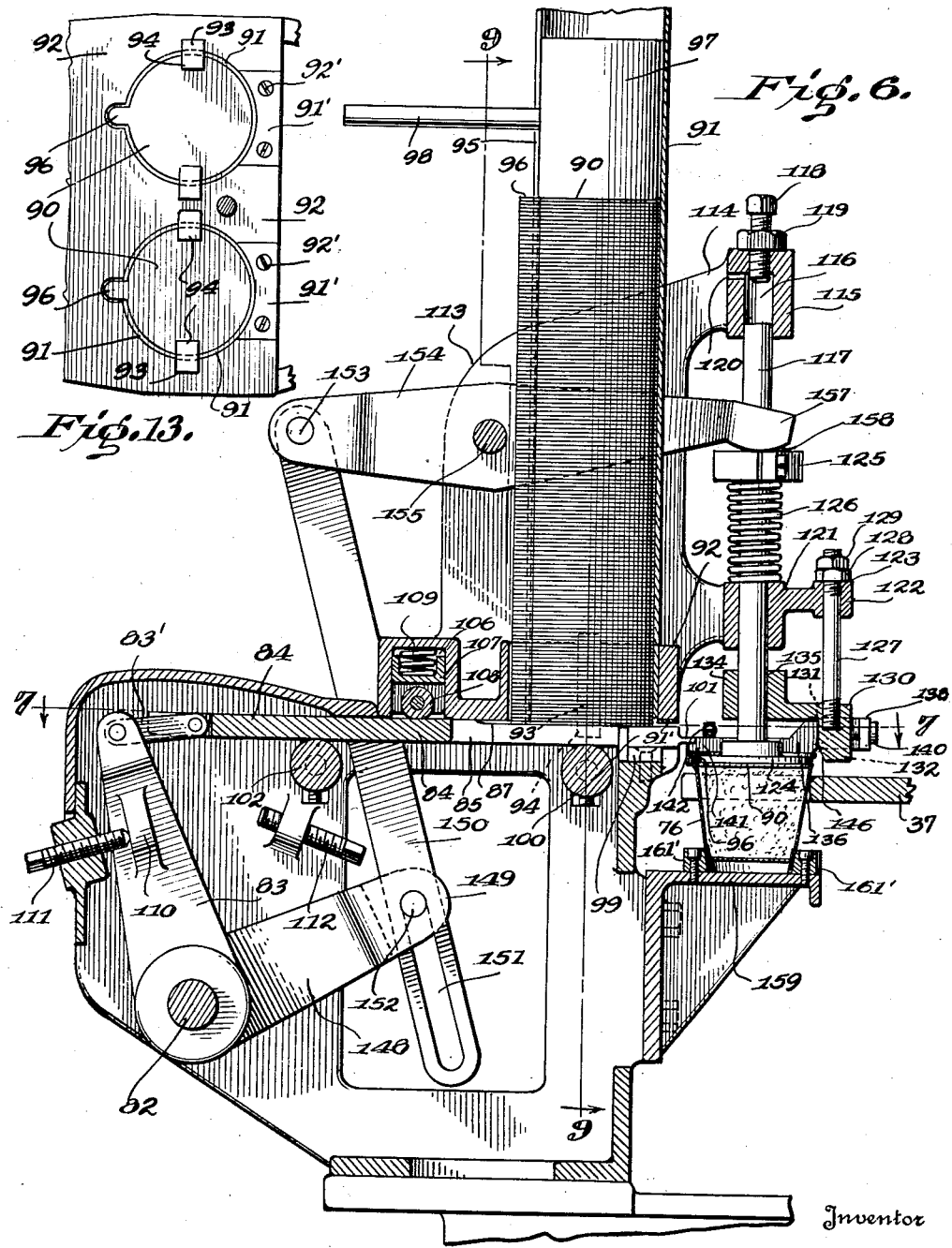

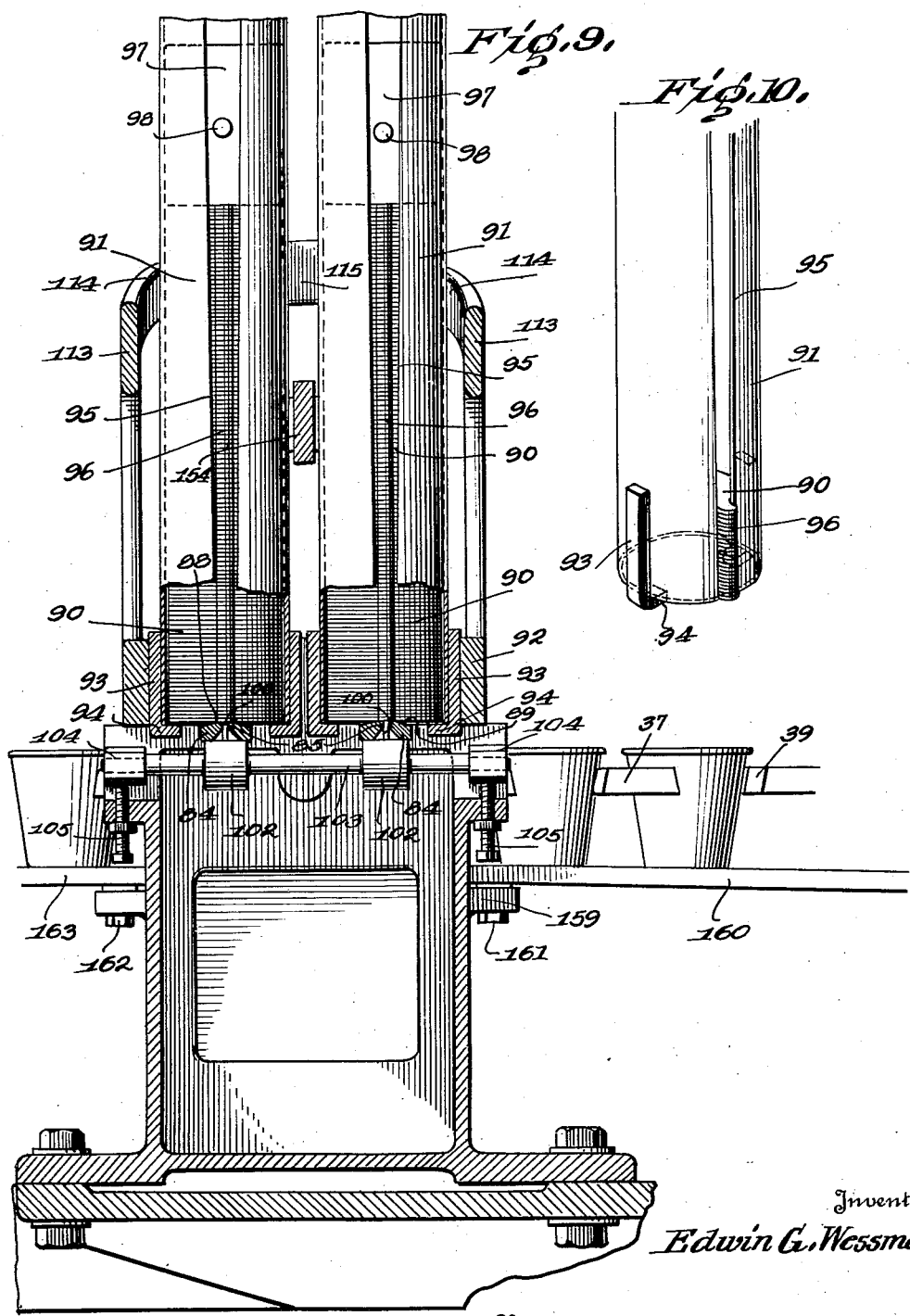

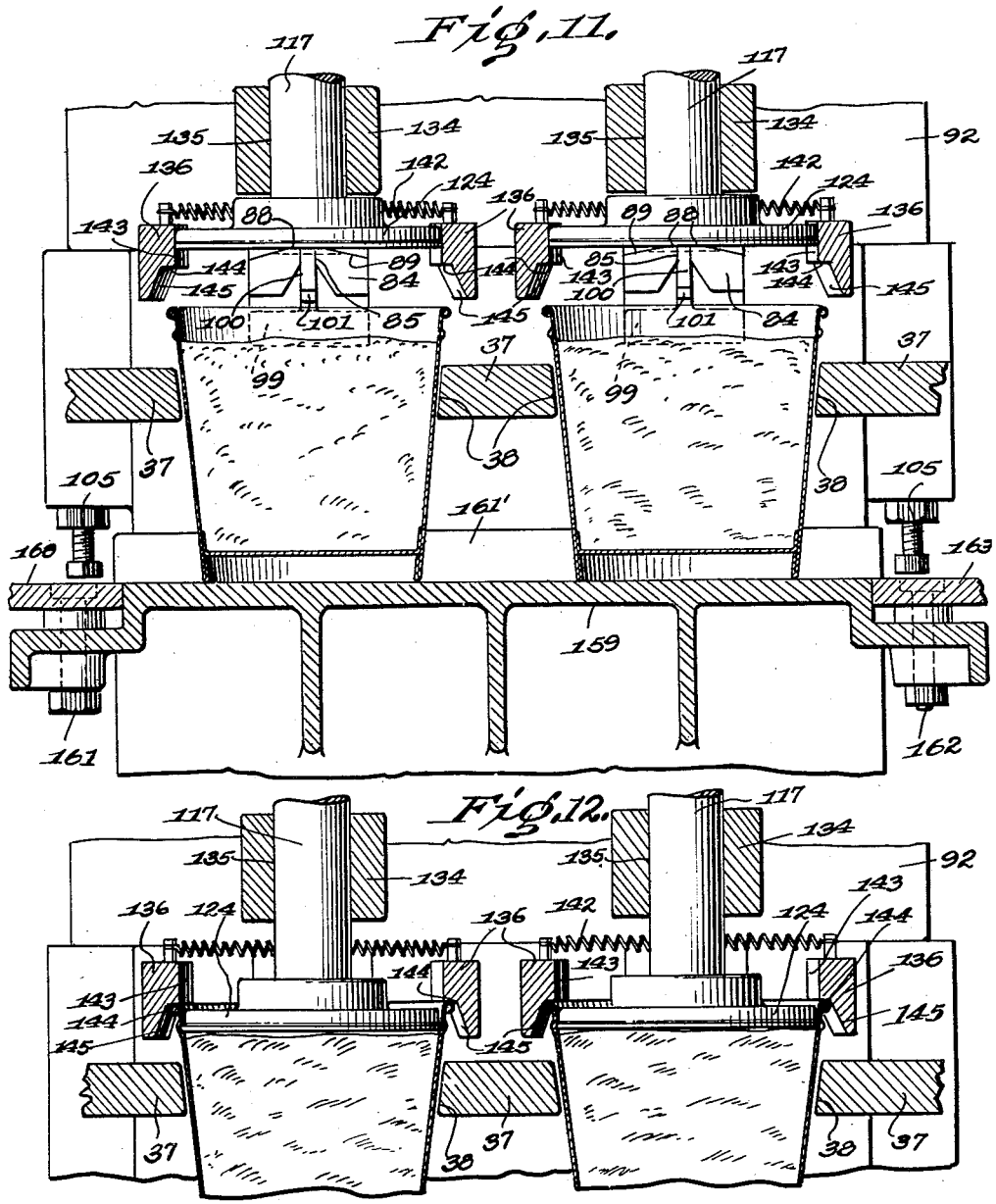

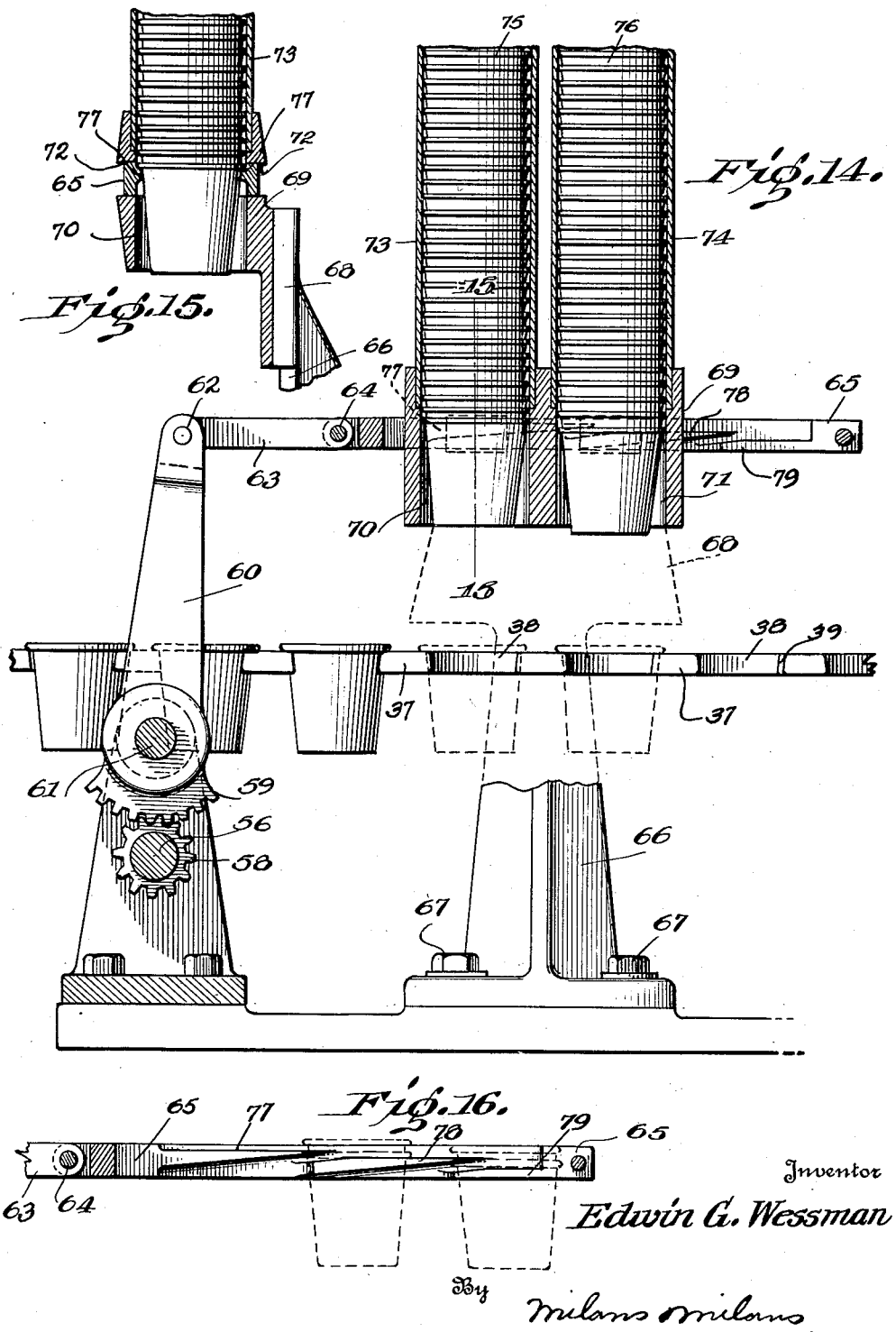

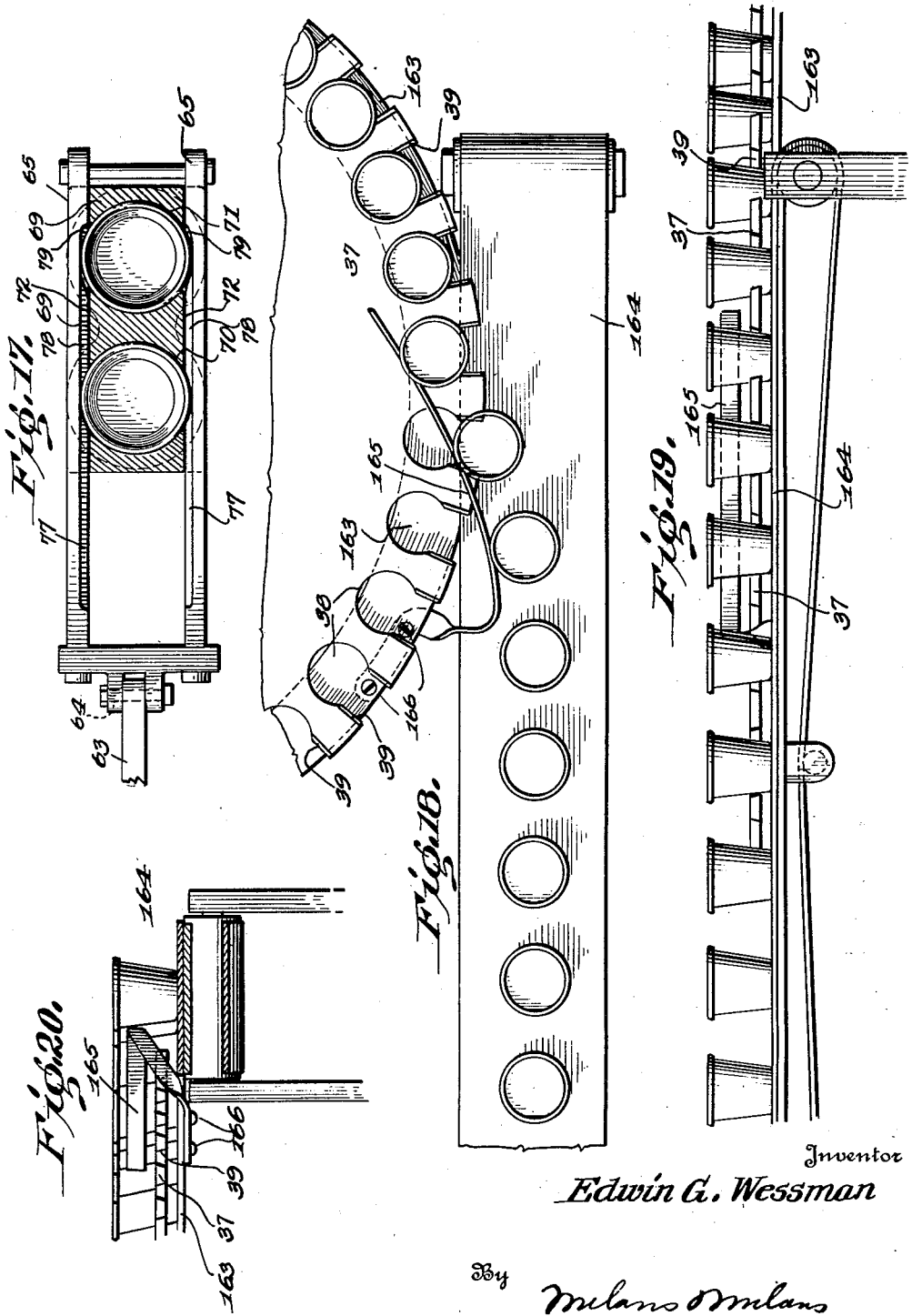

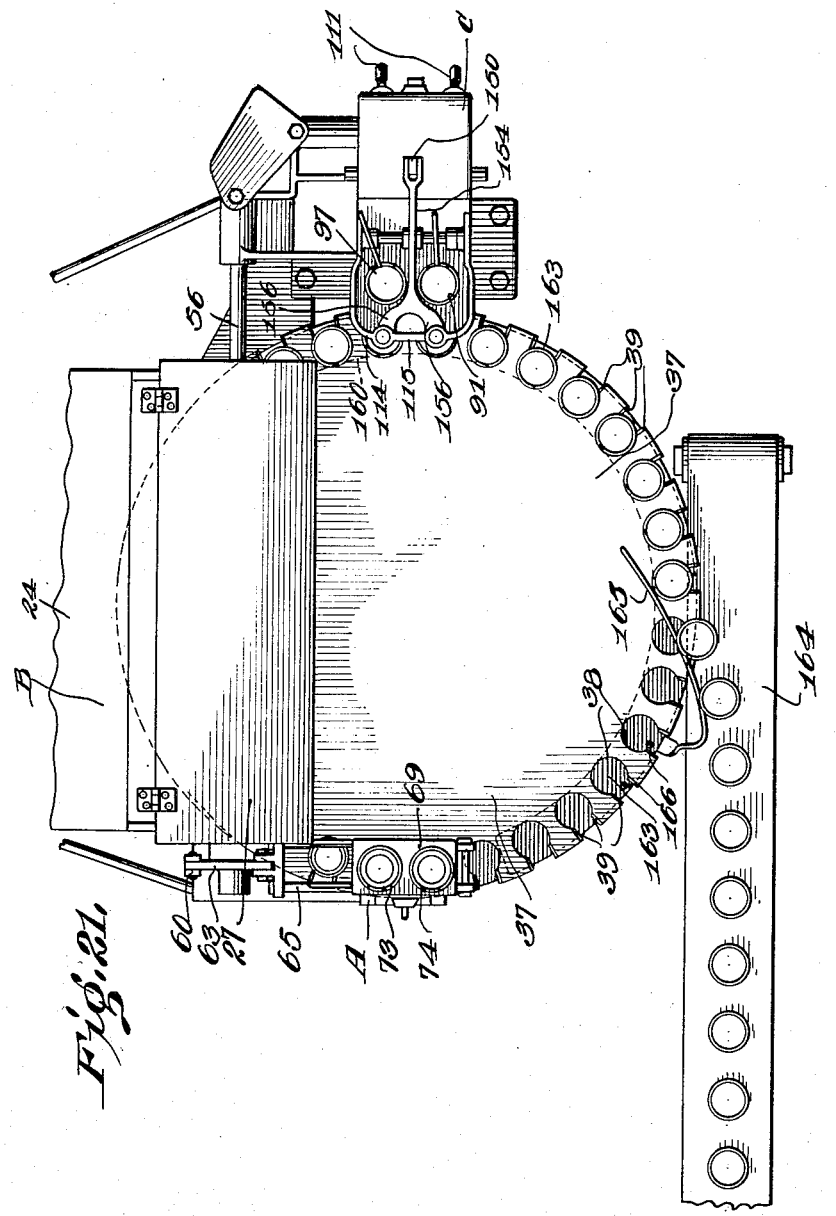

Patented Mar. 22, 1932

1,850,522

UNITED STATES PATENT OFFICE

EDWIN G. WESSMAN, OF EASTON, PENNSYLVANIA, ASSIGNOR TO INDIVIDUAL DRINKING CUP COMPANY, INC., OF EASTON, PENNSYLVANIA, A CORPORATION OF NEW YORK

DISPENSING, FILLING, AND CAPPING MACHINE

Application filed September 20, 1926. Serial No. 136,682.

My invention relates to new and useful improvements in machines for dispensing, filling and capping receptacles, and more particularly to a machine for filling paper or similar receptacles with ice cream or similar material and then capping the filled receptacle, the primary object of the invention residing in the provision of such a machine adapted for continuous operation and in which the delivery of the receptacles, the filling of the receptacles, and the capping of the receptacles, is done successively.

Another object of the invention resides in the provision of a machine of the character described in which there is a rotatable table, and a plurality of operating stations, and means for intermittently rotating the table for successively bringing the receptacles carried thereby into position relative to the stations.

A further object of the invention consists in the provision of a machine of the character described in which there is a station or machine for holding a plurality of receptacles, a station or receptacle for holding the material to be discharged into the receptacles, a station or machine for holding a stack of closure caps, and a rotatable table or other support for receiving a predetermined number of the receptacles from the station or machine supporting the same, said table or other support being intermittently rotated to position the receptacles carried thereby first beneath the receptacle containing the material to be delivered, and secondly beneath the station or machine containing the stacks of closure caps.

Another object of the invention consists in the provision of means whereby the cup dispensing mechanism, the material delivery mechanism, the capping mechanism, and the rotatable table or support may be operated from a single source of power, the operating mechanism being so timed as to successively carry forward the steps of delivering the receptacles, filling the same, and capping.

As another object of the invention I provide a novel form of dispensing machine or apparatus in which a stack of nested receptacles may be supported and a single receptacle delivered from the stack while the remaining receptacles are supported, the receptacle to be delivered being forcibly separated from those remaining in the stack.

As still a further object of the invention I provide a novel form of machine or receptacle for containing a stack of closure caps, and means for delivering a single cap from the stack to be positioned in proper place for insertion into the filled receptacle.

I have for still another object the provision of novel means for receiving the closure cap discharged from the stack of caps within the holding machine and holding said single cap in position relative to the receptacle to be capped until such time as the capping plunger is operated to forcibly release the cap and to position the same in the open end of the receptacle, the means for holding the single cap also acting to engage the receptacle and properly center the same for the reception of the cap.

In carrying forward my invention I also have for an object the provision of a novel form of rotatable table for receiving and positioning the receptacles, said table being formed with a plurality of recesses into which the receptacles are dropped and held until such time as filling and capping has taken place, means being provided for raising the receptacles, relative to the table, and allowing their discharge from the recesses at a predetermined point.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation.

Fig. 2 is a top plan.

Fig. 3 is a side elevation looking in a direction opposite to that disclosed in Fig. 1.

Fig. 4 is a horizontal section on the line 4—4 of Fig. 3.

Fig. 5 is a section on the line 5—5 of Fig. 3, looking in the direction of the arrows.

Fig. 6 is a section on the line 6—6 of Fig. 3.

Fig. 7 is a horizontal section on the line 7—7 of Fig. 6 looking in the direction of the arrows.

Fig. 8 is a detail perspective of the slide for delivering the lowermost closure cap from the supporting stack.

Fig. 9 is a vertical section on the line 9—9 of Fig. 6 looking in the direction of the arrows.

Fig. 10 is a detail fragmental perspective showing the lower end of one of the closure cap magazines.

Fig. 11 is a fragmental transverse vertical section, with parts shown in elevation, showing the spring controlled arms for holding a closure cap and the inserting plunger in raised position with the receptacle positioned therebeneath.

Fig. 12 is a view similar to Fig. 11 showing the cap holding means and the inserting plunger in their lowered or capping position.

Fig. 13 is a bottom plan of the cap magazines and supporting means therefor.

Fig. 14 is a fragmental side elevation of the rotatable table for carrying the receptacles and the operating mechanism for the receptacle dispenser, the magazine for holding the stacks of receptacles being shown in transverse vertical section.

Fig. 15 is a section on the line 15—15 of Fig. 14.

Fig. 16 is a longitudinal vertical section, with parts shown in elevation, through the slide or frame which delivers the receptacles from the stack and forcibly separates that receptacle to be delivered from those remaining in the stack.

Fig. 17 is a top plan of the slide or frame shown in Fig. 16.

Fig. 18 is a fragmental top plan of the rotatable receptacle supporting table, the conveyor for receiving the receptacles, and the means for removing the receptacles from the rotatable table and positioning them upon the conveyor, this being a modification of the form of the invention described in the preceding figures.

Fig. 19 is a side elevation of the parts shown in Fig. 18.

Fig. 20 is a transverse vertical section through the conveyor shown in Figs. 18 and 19 with the edge of the rotatable table, the receptacles, and the delivering arm, shown in elevation.

Fig. 21 is a fragmental top plan of the form of the invention disclosed in Figs. 18, 19 and 20 illustrating the dispensing, filling and capping mechanism relative to the conveyors.

In recent years paper receptacles, such as paper drinking cups, have come into extensive use and more recently it has been found that they may be used for packaging various materials such as ice cream or the like. It can readily be appreciated that in the use of such receptacles it is desirable that means be provided whereby they may be quickly filled with the desired material and closure caps applied thereto. I have provided a machine adapted more particularly for filling small paper cups or receptacles with ice cream, the cups being dispensed for delivery beneath the filling mechanism and after being filled are automatically capped or closed and delivered in position for removal to any desired place of display or storage.

In the drawings 1 indicates the table supported by the legs 2. Supported on the table 1 is the electric motor 3 which drives the pinion 4 meshing with the gear 5 secured to one end of the horizontal shaft 6, the opposite end of the horizontal shaft having the beveled gear 7 secured thereto. The electric motor 3 is controlled from the switch 8 within easy reach of the operator. The beveled gear 7 meshes with the beveled gear 9 carried by the vertical shaft 10. The upper end of the shaft 10 extends through the top of the table 1 and has secured thereto, above the top of the table, the disc 11 carrying the guide 12 in which is slidably mounted a block having the vertically extending pin 13 to which one end of a link 14 is pivotally connected. The block carrying the pin 13 is adjustable within the guide 12 by means of the adjusting screw 15. The opposite end of the link 14 is pivotally connected at 16 to the slide 17 carrying the plungers 18 for a purpose to be later described.

Pivotally connected to the top of the table at 19 is the arm 20 carrying the roller 21 adapted to operate in an eccentric groove 22 provided in the under surface of the disc 11. Pivotally connected to the outer end of the arm 20 is the rod 23 for a purpose to be later described.

Supported upon the table 1 is the container 24 for ice cream or similar material, the material being discharged from the container through means of a rotatable valve shown at 25. The valve 25 is operated through means of the rod 23, one end of the rod being connected to the valve at 26. The plungers 18, carried by the slide 17, are adapted for discharging the ice cream or other material from the valve 25 into the receiving receptacles in a manner as will be presently described. A cover, for the container 24, is shown at 27. Connected to the vertical shaft 10, beneath the beveled gear 9, are the eccentrics 28 and 29. Surrounding the eccentric 28 is a band or ring 30 to which is connected one end of a rod 31, the opposite end of the rod 31 being connected to the arm 32 mounted for oscillating movement and carrying the pawl 33 which is normally held in engagement with the toothed plate 34 by means of the spring 35. The toothed plate 34 is connected to a vertical shaft 36 to the upper end of which is connected the rotatable table 37 which is provided with the recesses 38, adjacent the marginal edge thereof, notches 39 being formed in the marginal edge of the plate or disc and communicating with the recesses 38. As the shaft 10 is rotated the rotatable table 37 will be rotated intermittently for a purpose to be later described.

Surrounding the eccentric 29 is the band or ring 40 to which is pivotally connected one end of the rod 41, the opposite end of the rod being connected to the depending arm 42 carried by the horizontal shaft 43. Also carried by the horizontal shaft 43 is the arm or projection 44 to which is connected the lower end of a vertically extending rod 45, the upper end of the rod 45 being pivotally connected at 46 to the outer end of an arm 47, the inner end of the arm 47 being connected to the shaft 48 to which is connected an agitator or stirrer, not shown, positioned within the container 24. As this stirrer or agitator forms no part of the present invention illustration or detail description thereof is not thought necessary.

The beveled gear 9 is constantly rotated, as can be readily appreciated, by the electric motor 3 and is adapted to be connected to or disconnected from the shaft 10 through means of suitable clutch mechanism shown generally at 49 operated through means of the rod 50 extending to the forward end of the machine. This clutch mechanism forms no part of the present invention and detail illustration or description thereof is not necessary.

For a further understanding of the operation of the machine so far described and more particularly with respect to the clutch mechanism attention is directed to the Mojonnier et al. Patents Nos. 1,502,314 of July 22, 1924, and 1,529,903 of March 17, 1925.

Carried by and depending from the horizontal shaft 43 is the arm 50' to the lower end of which is pivotally connected at 51 the sleeve 53 within which telescopes the rod 52 which is pivotally connected at 54 to the arm 55 connected to and depending from the horizontal shaft 56 intermediate the ends thereof as shown more particularly in Fig. 2. The rod 52 and sleeve 53 are yieldably connected by the coiled springs 57 so as to form a yieldable connection between said rod 52 and sleeve 53 and to allow for movement of one relative to the other should any part of the machine become clogged and inoperative.

Secured to the horizontal shaft 56, adjacent one end thereof, as shown more particularly in Figs. 1 and 14 of the drawings, is a gear wheel 58 which meshes with the teeth 59 formed on the arcuate lower end of the arm 60 which is mounted upon the horizontal shaft 61. Pivotally connected at 62, adjacent the upper end of the arm 60, is a link 63 which is pivotally connected at 64 to the slide or frame 65. Extending upwardly from the top of the table 1 is the standard 66 which is secured to the table by means of the bolts or other suitable fastenings 67. The upper end of the standard 66 is wedge-shaped as shown at 68 and supports the casting 69 having the vertically extending openings 70 and 71 therein. The casting 69 is formed at each side with the cut-out portions 72 in which the side arms of the slide or frame 65 extend as more particularly illustrated in Fig. 15 of the drawings. Supported by the casting 69 are the tubes or magazines 73 and 74 for supporting the stacks 75 and 76 of nested paper receptacles, the tube 73 aligning with the vertically extending opening 70 and the tube 74 aligning with the vertically extending opening 71.

Extending inwardly from each side bar of the slide or frame 65 are the ledges or flanges 77, 78 and 79. The flanges 77 and 78 normally support the lowermost cups of the stacks 75 and 76 respectively of the cups or receptacles as shown more particularly in Fig. 14 of the drawings and as the cups or receptacles are nested the entire stacks are supported. When the cups are to be dispensed the frame or slide 65 will be initially moved or slid towards the left as shown in Fig. 14 and this will allow the lowermost cup of the stack 75 to drop upon the ledge or flange 78 and the lowermost cup or receptacle of the stack 76 to drop upon the ledge or flange 79. The ends of the ledges or flanges 77 and 78 are beveled, as quite clearly shown in Fig. 16 of the drawings, and as the frame or slide 65 is moved to the right the flange 77 will pass over the upper end of the lowermost cup or receptacle in the stack 75 and beneath the upper flanged end of the next cup or receptacle. Likewise the ledge or flange 78 will pass over the upper end of the lowermost cup or receptacle of the stack 76 and beneath the upper flanged end of the next adjacent cup or receptacle. Continued movement of the slide or frame 65 to the right will allow the lowermost cups of the stacks to drop from the ledges or flanges 78 and 79 and through the openings 70 and 71 of the casting 69 to be received in the openings or recesses 38 of the plate 37 therebeneath. The ledges or flanges 77 and 78 being tapered or wedge-shaped forcibly separate the lowermost cups or receptacles from the stacks as they pass over the upper ends thereof. It will thus be seen that the frame or slide 65 at all times supports the cups or receptacles within the magazine and allows the lowermost cups or receptacles to be discharged therefrom, sticking of the lowermost cup or receptacle being prevented by the forcible ejection caused by the wedged or inclined flanges engaging between the upper ends of the receptacles as described.

When the cups or receptacles drop into the openings or recesses 38 in the plate 37 they are supported by the upper flanged ends thereof overlying the edges of the recess. As shown the cups or receptacles are of greater diameter at the top than at the bottom. The openings or recesses 38 are of a diameter equal to the upper diameter of the receptacle below the flanged ends and the notches 39 are of a width equal to the diameter of the lower ends of the receptacles for a purpose which will be later described.

Secured to that end of the shaft 56 opposite to the end to which the gear 58 is secured is the beveled gear 80 which meshes with the beveled gear 81 secured to the horizontal shaft 82. Secured to the shaft 82 and extending upwardly therefrom is a pair of arms 83 adjacent the upper ends of which are pivotally connected one end of the links 83', the opposite end of the links being pivotally connected to the rear end of the slide or ejector 84. As each of the pair of ejectors or slides are of the same formation, and operated in the same manner, a description of one will suffice for both. The forward end of the slide or ejector 84 is slotted longitudinally as shown at 85 and the upper face is cut away to form the shoulder 86 and the recess or depression 87. The cutting away of the upper surface to form the shoulder 86 provides the longitudinally extending flat edge portions 88 and the beveled surfaces 89 extending downwardly therefrom towards the outer edges. The advantage in having this formation of the outer end of the slide or ejector will be later described. Each of the slides or ejectors 84 normally is positioned as shown more particularly in Fig. 5 of the drawings beneath the stacks of closure caps 90 arranged in the tubes or magazines 91, the lower ends of which are received in the casting 92 as shown more particularly in Figs. 6 and 9 of the drawings. Wear plates 91' are secured to the bottom face of the casting 92, adjacent the forward edge thereof, and the lower ends of the magazines by means of the screws 92'. The lower end of each of the tubes or magazines 91 has formed on or secured to the sides, the vertically extending ribs or projections 93 which will be received in slots formed in the casting so as to properly position the tubes or magazines and hold the same against rotary movement. The lower ends of the ribs or projections 93 are bent or formed at right angles to provide the inwardly extending feet or projections 94 which support the stacks of caps within the tube or magazine. This allows the tube or magazine to be moved with the caps therein. Each of the tubes or magazines 91 is also provided with a vertically extending tapered slot 95 through which the ears or projections 96 formed on the caps 90 will project as shown more particularly in Figs. 6 and 9 of the drawings. As the slot is tapered to be of less width at the lower end than at the upper end the tabs or projections 96 will be aligned as they reach the lower end of the tube or magazine to be properly positioned for ejection by the slide or ejector 84. A weight 97 is received in each of the tubes or magazines, on top of the stacks of closure caps, and extending outwardly from each of the weights is a handle 98. The handles will project through the slots 95 formed in the tubes or magazines. The tubes or magazines are arranged in pairs as shown.

Secured beneath each or the tubes or magazines 91, and the forward edge of the casting 92, is a pair of plates 99 each of which has an upwardly extending longitudinal rib or flange 100 from the forward end of which extends the lip or projection 101 for a purpose to be later described. The upper surfaces of the ribs or flanges are sufficiently spaced below the lower ends of the tubes and the lower surface of the castings 92 to allow a single closure cap to pass therebetween. The ribs or flanges 100 are of such a width as to be received within the slot 85 formed in the forward end of the slide or ejector 84 when the slide or ejector is moved forwardly.

The slides or ejectors 84 are mounted upon the rollers 102 carried by the shafts 103 the ends of which are carried in the bearings 104 adjustable by the screws 105. The casting 92 is formed with a pair of recesses 106 extending from the lower surface thereof and in these recesses are mounted the carriages 107 which support the rollers 108 which engage the upper surfaces of the slides or ejectors as shown more particularly in Fig. 6 of the drawings. The carriages 107 are normally held in their lowermost positions, with the rollers in contact with the slides or ejectors by means of the coiled springs 109.

Each of the arms 83 is provided with an outwardly extending car 110 to be engaged by an adjustable screw 111 as shown more particularly in Fig. 6 of the drawings, these adjustable screws, contacting with the ears, limiting the rearward movement of the arms. The forward movement of the arms are limited by the adjustable screws 112 which will engage the edges of the arms as shown more particularly in Fig. 5 of the drawings.

The casting 92, which receives the lower ends of the tubes or magazines 91 is provided with the upwardly extending side portions 113 which have the forwardly extending arms 114 connected by the cross piece 115. The cross piece 115 is provided with a pair of transversely spaced recesses 116 which form guides for the reception of the upper ends of the plunger rods 117 as more particularly illustrated in Fig. 6. A screw 118 extends into the upper end of each of the recesses 116 and is adapted for limiting the upward movement of the plunger rods. Lock nuts are shown at 119. Openings 120 communicate with the recesses 116 to relieve air pressure in the recesses 116 as the plunger rods 117 are raised. The plunger rods 117 also pass through the guides 121 extending forwardly from the side portions 113 as more particularly illustrated in Figs. 5 and 6 of the drawings and each of the guide portions 121 is provided with a forwardly extending arm 122 having the vertically extending opening 123 for a purpose to be later described. Secured to the lower end of each of the plunger rods 117 is a plunger head 124 of a diameter to be received within the open end of the cup or receptacle to be capped. Secured to each of the plunger rods 117 is an adjustable split collar 125 and surrounding each of the rods, between the lower surface of the collar 125 and upper surface of the guide portion 121 is a coiled spring 126, the coiled springs normally holding the plunger rods in their raised positions.

Extending through the opening 123 in the arm 122 is the rod 127 the upper end of the rod being threaded to receive the nut 128 and the lock nut 129. The rod 127 is freely slidable through the opening in the arm. The lower end of the rod 127 carries the casting 130 the ends of which are forked to form the upper ear 131 and the lower ear 132 for a purpose which will be later described. Extending inwardly from the casting 130 is the arm 133 having the enlargement 134 formed thereon and provided with the vertically extending opening 135 through which the plunger rod 117 passes. Pivotally connected to each end of the casting 130, between the upper and lower ears 131 and 132, respectively thereof, is an arm 136, the pivot point being shown at 137. The outer end of each of the arms is formed with the right angle extension 138 having an opening 139 therein through which passes an adjusting screw 140. The inner or free end of each of the arms is beveled as shown at 141 and the free ends of the arms are drawn one towards the other by mean of the coiled spring 142. Each of the arms, intermediate its ends, is formed with an arcuate shaped recess 143 and the inner edge of the arms adjacent said arcuate-shaped recess is cut away at the bottom to form the shoulder 144 and the inclined surface 145 as shown more particularly in Figs. 11 and 12 of the drawings. The inner face of the casting 130, at the bottom edge thereof, is beveled as shown at 146. The inward movement of the free ends of the arms 136, by the coiled spring 142, is limited by the head of the adjusting screw 140 as can be readily seen by reference to Fig. 7 of the drawings. When the plunger rod 117 is in its raised position the head 124 will hold the arm 134 with its associated pivoted arms in the raised position shown more particularly in Fig. 5 and when the plunger rod and its associated head is lowered, in a manner to be later described, the arm 133 will drop with said plunger head until the nut 128 engages the arm 122 and when this takes place the arm 133 with its associated parts will be held in the position shown in Fig. 6 but the plunger rod and head may continue its downward movement into the open end of the receptacle.

Secured to the horizontal shaft 82 is an inwardly extending arm 148 the outer end of which is formed as shown at 149 to receive the bar 150 having the elongated opening 151 formed therein. A transversely extending pin 152 is carried by the forked end of the arm 148 and operated in the elongated opening 151 of the bar 150. The upper end of the bar is pivotally connected at 153 to the end of the lever 154 which is carried by the transversely extending shaft 155 supported by the sides 113 extending upwardly from the casting 92. The lever 154 extends between the pair of tubes or magazines 91, as shown more particularly in Fig. 2 of the drawings, and as also shown in this particular figure the outer end of the lever is forked or bifurcated to form the arms 156 each of which is forked as shown at 157 and straddles one of the plunger rods 117. The lower faces of the forked portions 157 are rounded as shown at 158 and are adapted to engage the upper surfaces of the collar 125 when the plunger rods and plungers are adapted to be operated.

When the cups or receptacles are initially dropped into the recesses or openings 38 they are supported by the flanged ends thereof engaging around the edge of said openings or recesses. However, it can be appreciated that during the capping operation or the operation of inserting the closure cap into the open end of the receptacle that it will be desirable to more securely support the receptacle. For this purpose I have secured at a point beneath the capping plungers 124 the stationary table or plate 159, said plate or table being of such a height, relative to the rotatable table 37 as to raise the upper ends of the cups or receptacles above the upper surface of the rotatable table as shown more clearly in Fig. 11 of the drawings. For raising or guiding the cups or receptacles onto the stationary table 159 I provide the inclined plate or strip 160 which is shown more clearly in Fig. 3 of the drawings. This strip or plate 160 is secured to the end of the stationary table 159 by means of the nuts and bolts 161, the end of the stationary table or plate 159 being slightly offset so that the upper face of the adjacent end of the plate or strip 160 may be flush with the upper surface of the plate or table 159. For guiding the lower ends of the cups or receptacles over the stationary table 159 I provide the longitudinally extending strips 161' between which the lower ends of the receptacles or cups pass as more clearly illustrated in Fig. 6 of the drawings. Secured to the opposite end of the table or plate 159, by means of the nuts and bolts 162, is the plate or strip 163 which is inclined upwardly as shown in Fig. 3. This inclined plate or strip 163 continues to gradually raise the cups or receptacles after they have left the capping mechanism, so that at the point where the cups or receptacles are to be removed the lower or smaller ends of the cups or receptacles align with the reduced notches 39, leading to the openings or recesses 38, and the cups or receptacles may be removed by a sliding movement, the lower or smaller ends of the cups or receptacles passing through the reduced portions 39.

The cups or receptacles may be removed from the rotatable table either by hand or automatically. In Figs. 17, 18 and 19 I have illustrated a modified form of the invention incorporating means for automatically removing the filled receptacles onto an endless conveyor 164. This conveyor is arranged in such position, relative to the rotatable table 37, that the cups or receptacles may be directed from the rotatable table onto the conveyor by means of the inclined arm 165 secured to a suitable support beneath the rotatable table by means of the screws 166 or other suitable fastening means.

Extending forwardly from the end of the machine are the arms 167 which support the arcuate-shaped table 168. The table is adjustable through means of the screws 169 carried by the arms 167 as shown more particularly in Fig. 3 of the drawings. This table 168 may be used for various purposes such as supporting the filled cups when removed from the rotatable table by hand.

At 170 I have shown in dotted lines a cover for the driving mechanism at one end of the machine this cover being pivotally connected at 171 so that it may be swung when desired, to gain access to the driving mechanism.

Having described the detail construction of my machine I will now give a further description of the operation. In describing the operation we will refer to A as being the cup dispensing station, B the filling station, and C the capping station. The machine is started by manipulation of the switch 8 which starts the electric motor 3. The pinion or gear 4, meshing with the gear 5 rotates the shaft 6 and this in turn through means of the beveled gear 7 rotates the beveled gear 9 which when the clutch mechanism 49 is connected rotates the shaft 10, the disc 11, and eccentrics 28 and 29. The table 37 is rotated periodically by the pawl 33 engaging the toothed wheel 34, the arm 32 carrying the pawl 33 being operated by the rod 31 which in turn is operated through means of the eccentrics 28. Each movement or rotation of the table 37 is the distance of two of the recesses or openings 38, it being understood that two cups or receptacles are dropped into the rotatable table, at a time that two cups will be filled at a time, and that two cups will be capped at the same time. Of course, I do not wish to limit myself to this particular arrangement for it will be understood that if desired the operation might be only on one cup or on more than two. With the table 37 stationary it is in position to receive the cups or receptacles. The cup dropping mechanism is operated through means of the eccentric 29 which operates the rod 41, the arm 42, the shaft 43, the shaft 43 in turn through means of the flexible connection operating the arm 55 which in turn oscillates the shaft 56. Secured to the shaft 56 is a gear 58 and as the shaft oscillates the gear 58 meshing with the teeth 59 swings the arm 60 and this arm in turn operates the slide or frame 65 to dispense the cups in the manner previously described. When two cups have been dropped into the recesses of the table the rotation of the table in the manner previously described carries them to position beneath the filling station B. Ice cream or similar material is discharged into the cups or receptacles through the valve 25 which is operated by the eccentric groove 22 which operates the pivoted arm 20 which in turn is connected to the rod 23 which operates the valve. The ice cream is discharged through the valve by means of the plungers 18 which are connected to the plates 17 operated by the link 14 connected to the disc 11. After the receptacles have been filled with the ice cream or other material they are carried to the capping station C. As has been previously described when reaching the capping station the cups or receptacles are raised and guided into the stationary table 159. When at the capping station the rotation of the shaft 56, in the manner previously described, through means of the beveled gears 80 and 81 oscillates the horizontal shaft 82. Initially the shaft 82 is rotated rearwardly or in the direction indicated by the arrows in Fig. 5 so that a cap 90 carried in the tube or container 91 may be received upon the slide or ejector 84. The cap will be positioned upon the forward end of the slide or ejector so that the shoulder 86 will engage the edge thereof. When in this position the table or projection 96 of the cap will be received in the recess 87. At this point I wish to lay particular stress on the advantage of having the inclined surfaces 89. This allows the cap to be properly engaged by the slide or ejector even though the cap be warped or otherwise drawn out of its normally flat condition. With the cap thus positioned upon the slide or ejector the position of the parts for receiving the cap is shown more particularly in Fig. 6 of the drawings. With the cap in position the slide or ejector is moved to the right of the position shown in Fig. 6 and carries with it the cap. The ejector will carry the cap into position between the spring arms 136 the movement of the cap engaging the beveled surfaces 141 of the spring arms opening them against the action of the coiled spring 142 so that the cap may be positioned between the arms and held thereby. With the caps thus held the oscillation of the shaft 82 again in that direction to draw the slide or ejector 84 into position for the reception of another cap will raise the arm 148. This movement will engage the pin 152 with the upper end of the elongated opening 151 and raise the bar 150. The raising of the bar 150 swings the lever 154 on its pivot point 155 to lower the outer end of the lever and the lowering of the outer end of the lever, causes the rounded or arcuate surface 158 thereof to engage the collar 125 and lower the plunger rod 117 and plunger head 124, against the action of the coiled spring 126. As the plunger head 124 is lowered it also allows the arm 133 carrying the pivoted arms 136 to be lowered until the nut 123 engages the upper surface of the arm 122. This limits the downward movement of the arm 133 with the pivoted arms 136. The lowering of the pivoted arms 136 causes the inclined surfaces 145 thereof to engage the upper edge of the cup or receptacle and thereby center the same in alignment with the cap carried by the pivoted arms. While the downward movement of the pivoted arms is limited by engagement of the nut 123 with the arm 122 the downward movement of the plunger rod and plunger head may be continued. This continued downward movement of the plunger head disengages the closure cap from the spring controlled pivoted arms and allows the same to be forced into the open end of the cup or receptacle as shown more particularly in Fig. 12. When the cap is being held by the spring controlled pivoted arms the lip or projection 96 overlies the lip or projection 101 formed on the upwardly extending ledge or flange 100 of the plate 99. As the cap is released from the spring controlled pivoted arms and is lowered by the plunger the lip or projection 96 engaging the lip or projection 101 is bent upwardly prior to the insertion of the cap in the open end of the receptacle. When the cap has been positioned within the receptacle the parts return to their original position and the raising of the plunger head 124 will raise the arm 133 and carry with it the pivoted arms. It will be understood that the pivoted arms not only act for receiving the closure cap from the ejector but hold the same until forced therefrom by the plunger. These pivoted arms also act for properly centering the cups or receptacles relative to the cap so that they will always be in position to receive the same. When the capping plungers are being lowered for positioning the caps in the cups or receptacles the slide or ejector 84 is being positioned for receiving a cap from the tube or magazine. Then when the cap is being ejected to position between the spring controlled pivoted arms the capped plunger is raised.

I wish to lay particular advantage on the feature of so forming the notches leading to the openings or recesses in the rotatable table that the cups can only be slid from the table when raised, the notches being of such a size that only the smaller diameter of the cups or receptacles may be passed therethrough. As previously stated the cups or receptacles may be either removed by hand or may be automatically removed and positioned upon a suitable conveyor.

From the above it will be found that I have provided a novel form of machine in which by a continuous operation cups or other receptacles are dispensed, and filled, and then capped.

In so far as there is common subject matter in both cases the present application is a continuation of my application filed June 5, 1926, Serial No. 114,008.

Having fully described my invention what I claim as new and desire to secure by Letters Patent is:

1. A machine of the character described including a conveyor having circumferentially spaced openings therein and notches extending from the margin and communicating with the openings, means for dispensing receptacles into the openings of the conveyor, the upper end of the receptacles being of a diameter greater than the width of the marginal notches but the lower end being of a diameter whereby the same may pass through the marginal notches, means for filling the receptacles carried by the conveyor, means for capping the filled receptacles, a second conveyor positioned adjacent the first mentioned conveyor, means for raising the receptacles relative to the first mentioned conveyor, and means for directing the filled and capped receptacles from the first mentioned conveyor onto the second mentioned conveyor, the lower end of the receptacles passing through the marginal notches in the first mentioned conveyor.

2. In a machine of the character described including in combination a receptacle dispensing means, means for filling the receptacles, and means for capping the filled receptacles, of a conveyor adapted to receive the receptacles from the dispensing means, said conveyor having circumferentially spaced openings adjacent the marginal edge thereof and notches extending from the marginal edge and communicating with the openings, the receptacles normally depending through the openings, and means for elevating the receptacles relative to the conveyor whereby they may be removed laterally through the notches communicating with the openings.

3. In a machine of the character described including in combination means for dispensing flanged receptacles, means for filling the receptacles, and means for capping the filled receptacles, of a rotatable conveyor having a plurality of openings therein to receive the flanged receptacles, the receptacles being supported and suspended through the openings by their flanges engaging the conveyor, and means positioned beneath and in the path of movement of the conveyor for supporting the bottom of the receptacles during the capping operation.

4. In a machine of the character described including in combination means for dispensing flanged receptacles, means for filling the receptacles, and means for capping the filled receptacles, of a rotatable conveyor having openings therein to receive the flanged receptacles, the receptacles being supported and suspended through the openings by the flanges thereof engaging the conveyor, and means positioned beneath and in the path of movement of the conveyor for raising the filled receptacles relative to the conveyor and supporting them in raised position during the capping operation.

5. In a machine of the character described including in combination means for dispensing flanged receptacles, means for filling the receptacles, and means for capping the filled receptacles, of a conveyor having a plurality of openings therein to receive the receptacles, the receptacles being supported by the flanges thereof engaging the conveyor, a guideway for raising the filled receptacles relative to the conveyor prior to the capping operation, and means for supporting the raised receptacles during the capping operation.

6. In a machine of the character described for filling and capping tapered receptacles, including a conveyor adapted to receive the receptacles, said conveyor having circumferentially spaced openings adjacent the marginal edge thereof and notches extending from the marginal edge and communicating with the openings, the notches being of a size whereby when the receptacles are raised they may be removed laterally therethrough.

7. A machine of the character described for filling and capping tapered receptacles, including a rotatable conveyor to receive the receptacles, said conveyor having circumferentially spaced openings adjacent the marginal edge thereof and notches extending from the marginal edge and communicating with the openings, and means positioned relative to the conveyor whereby the receptacles may be raised to facilitate lateral removal of the receptacles through the notches communicating with the openings, said notches being of a size to allow the lower smaller portion of the receptacle to pass therethrough but to prevent removal of the larger portion of the receptacle therethrough.

8. In a machine of the character described for filling and capping tapered receptacles, including a conveyor adapted to receive the receptacles, said conveyor having circumferentially spaced openings adjacent the marginal edge thereof and notches extending from the marginal edge and communicating with the openings, the notches being of a size whereby when the receptacles are raised they may be removed laterally therethrough, and means adapted to engage the receptacles and move them laterally through the notches.

9. In a machine of the character described for filling and capping tapered receptacles, including a conveyor adapted to receive the receptacles, said conveyor having circumferentially spaced openings adjacent the marginal edge thereof and notches extending from the marginal edge and communicating with the openings, the notches being of a size whereby when the receptacles are raised they may be removed laterally therethrough, and means overlying the conveyor and adapted to engage the receptacles and move them laterally through the notches.

10. In a machine of the character described for filling and capping tapered receptacles, including a conveyor adapted to receive the receptacles, said conveyor having circumferentially spaced openings adjacent the marginal edge thereof and notches extending from the marginal edge and communicating with the openings, the notches being of a size whereby when the receptacles are raised they may be removed laterally therethrough, and an arm overlying the conveyor and adapted to engage the receptacles and move them laterally through the notches.

In testimony whereof he hereunto affixes his signature.

EDWIN G. WESSMAN.